(12) United States Patent
Ben-David

(10) Patent No.: US 7,493,805 B2
(45) Date of Patent: Feb. 24, 2009

(54) APPARATUS AND METHOD FOR TESTING THE PERFORMANCE OF A VEHICLE

(76) Inventor: Yona Ben-David, 4 Yasmin Street, Ramat Efal 52960 (IL)

( * ) Notice: Subject to any disclaimer, the term of this patent is extended or adjusted under 35 U.S.C. 154(b) by 0 days.

(21) Appl. No.: 11/198,897

(22) Filed: Aug. 8, 2005

(65) Prior Publication Data
US 2006/0130567 A1 Jun. 22, 2006

Related U.S. Application Data

(63) Continuation of application No. 10/185,751, filed on Jul. 1, 2002, now abandoned.

(51) Int. Cl.
*G01M 17/00* (2006.01)
(52) U.S. Cl. ............................. 73/117; 73/123
(58) Field of Classification Search ............ 73/112, 73/116, 117, 117.2, 117.3, 118.1, 121, 122, 73/123, 124, 125
See application file for complete search history.

(56) References Cited

U.S. PATENT DOCUMENTS 3,899,916 A * 8/1975 Cline ........................... 73/126
3,965,731 A * 6/1976 Asmus ......................... 73/126
4,158,961 A * 6/1979 Ben-David ................... 73/117
5,973,274 A * 10/1999 Zarchy ......................... 177/132

* cited by examiner

*Primary Examiner*—Eric S McCall

(57) ABSTRACT

An apparatus for testing the brakes, wheel alignment, suspension, transmission, and engine of motorized wheeled vehicles, includes a dynamometer for self-calibration. A platform supports a road vehicle to be tested. Two or four pairs of short high-inertia rollers are revolvably supported adjacent to the platform, and positioned to individually support either the front wheels or the back wheels of the vehicle. The rollers are drivable by a stationary vehicle resting thereon, each pair of high-inertia rollers supporting one vehicle wheel. A floating roller contacts the wheel to detect side forces. Sensors are connected to the rollers and a computer for data processing, display and recording is connected to the sensors. Speed of the rollers is monitored by an encoder having a resolution of at least 1000 pulses/sec. A preferred embodiment of the apparatus includes electric motors which can be connected to drive the rollers.

20 Claims, 3 Drawing Sheets

DRIVING DIRECTION

APPARATUS AND METHOD FOR TESTING THE PERFORMANCE OF A VEHICLE

CROSS REFERENCE TO RELATED APPLICATIONS

This application is a continuation of and claims the benefit of U.S. Ser. No. 10/185,751, filed on Jul. 1, 2002 and entitled, "SYSTEM FOR TESTING VEHICLE ROAD DYNAMIC, SAFETY SYSTEMS AND CALIBRATION OF THE TESTER SYSTEM".

FIELD OF INVENTION

The present invention relates to the testing of road vehicles. More particularly, the invention provides an improved apparatus for testing the brakes, wheel alignment, and further essential components of a wheeled road vehicle while one or two vehicle wheels revolve while the vehicle remains stationary on the test stand.

BACKGROUND OF THE INVENTION

In many countries wheeled road vehicles, such as cars, trucks, vans, buses, need to be tested usually yearly, before a road license is granted to the owner by the controlling authority. The required tests include factors such as wheel alignment, steering, and brake functioning, besides visual examination of components such as tires.

In recent years the European Economic Community has started to demand brake testing in a manner said to parallel brake operation under road conditions. Applicable standards include 96/96/UE, 92/55/EEC, 77/143/EEC, and 71/320/EEC. Most test stands in use today do not comply with these European standards Furthermore, as ABS systems have come into wider use, a need has arisen to test such braking systems under realistic conditions.

Also those wishing to purchase a used vehicle may order testing in order to verify beforehand whether the vehicle has faults which are either to be repaired by the seller or to be considered in determining an agreed purchase price. A vehicle buyer is however interested in matters which are of little concern to a licensing authority—for example, engine performance under load, state of the suspension, the state of the transmission, including the gearbox and factors such as gear slip in automatic transmissions. Prior art test stands may meet the requirements of the licensing authority but still do not provide all the information which is of interest to a buyer. A further significant limitation of existing test stands is that the twin rollers which support the front or rear wheels are made long enough to cover the vehicle width. This makes fault detection of an individual wheel difficult, and does not allow the testing of ABS braking systems. Furthermore, prior art test stands have no arrangement for verifying the accuracy of the test apparatus.

A further limitation of present-day test stands is an inability to test the vehicle automatic transmission, without dismantling same, and without driving the vehicle out of the testing station.

The state of the art can be gauged by review of recent US Patents.

In U.S. Pat. No. 6,192,303 Takakura et al. disclose a vehicle diagnosis apparatus. A portable diagnosing unit is connected to a vehicle-mounted electronic control unit. A stationary host computer receives data by wireless from several vehicles so equipped. Each vehicle is identified by a number, and a ROM contains a suitable computer program to carry out the diagnosis.

Yamaguchi et al. relate to the relationship between vehicle slip angle and the road surface in the device described in U.S. Pat. No. 6,308,115.

Lohberg et al propose a method for measuring yaw rates and other quantities described in U.S. Pat. No. 6,317,674. Two independent measuring channels are proposed. A control signal intended to effect a correction is produced by a logic controller.

There is therefor a need for a vehicle test apparatus which has the capacity to accurately measure a wider range of vehicle properties than are available in prior art test stands.

It is therefore one of the objects of the present invention to obviate the limitations of prior art vehicle test stands and to provide an apparatus which meets present day requirements, including information desired by a prospective vehicle buyer, such as suspension and wheel geometry, brake performance, and characteristics of engine performance and the condition of an automatic transmission.

It is a further object of the present invention to test and calibrate the dynamometer used for vehicle testing at high speed and under conditions similar to road conditions.

The present invention achieves the above objects by providing an apparatus for testing the brakes, wheel alignment, suspension, transmission, and engine of motorized wheeled vehicles, including means for calibrating said apparatus, comprising:

a platform arranged to allow a heavy vehicle to be placed thereon;

at least two pairs of high-inertia rollers supported by the platform and positioned to support either the front wheels or the back wheels of the vehicle, the rollers being drivable by a stationary vehicle resting thereon, each pair of the high-inertia rollers supporting one wheel of the vehicle;

and sensor means connected to the rollers and data processing, display and recording means connected to the sensors.

In a preferred embodiment of the present invention there is provided a testing apparatus wherein the high-inertia rollers are connectable to at least one electric motor allowing the rollers to drive the vehicle wheels resting thereon.

In a most preferred embodiment of the present invention there is provided a testing apparatus further provided with a floating roller positioned between the inertia rollers and above the center thereof and being connected to means urging the floating roller upwards into contact with a vehicle wheel thereabove.

Yet further embodiments of the invention will be described hereinafter.

Due to the wide range of tests which can be performed by the apparatus described in the present specification, it is feasible that the apparatus would also be of interest to companies developing motor vehicles. Such companies may carry out hundreds of tests simultaneously, as described in MACHINE DESIGN, Mar. 7, 2002, p 114 "Mobile test system ready to roll—and grow" but would also be helped by an apparatus much easier to use for preliminary screening of new designs.

It will thus be realized that the novel device of the present invention also serves to reveal the interaction between the tested parameters. For example, in the course of executing a series of brake tests to determine brake fading and further characteristics, the reaction of the suspension is monitored, and faults such as bad shock absorbers or suspension distortion will be revealed and recorded.

The utility of the present invention is further enhanced by the possibility of adding further optional equipment such as flywheels (for testing large vehicles) and a power absorption unit (for applying a steady-state load for extensive engine, retarder and gearbox testing).

Most prior-art vehicle test stands are equipped with encoders providing 100 pulses per revolution. By using a 1000 pulse encoder, preferably 1200, accuracy is much improved, the finer resolution being needed particularly for calculation of accelerations and decelerations, and for testing gear slip in automatic gearboxes.

The invention will now be described further with reference to the accompanying drawings, which represent by example preferred embodiments of the invention. Structural details are shown only as far as necessary for a fundamental understanding thereof. The described examples, together with the drawings, will make apparent to those skilled in the art how further forms of the invention may be realized.

DETAILED DESCRIPTION OF PREFERRED EXEMPLARY EMBODIMENTS

Figure 1:
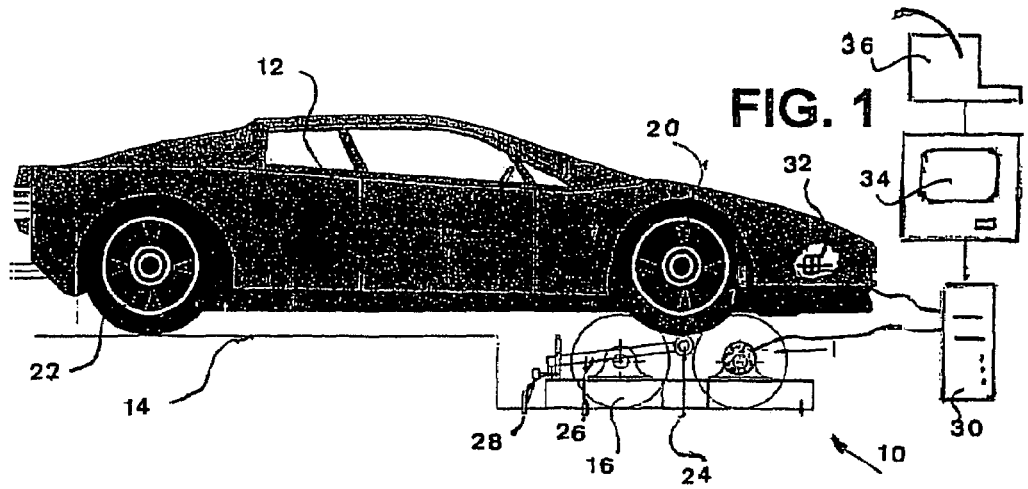
FIG. 1 is an elevational view of a preferred embodiment of the apparatus according to the invention, seen testing a road vehicle.

There is seen in FIG. 1 an apparatus 10 for testing the brakes, wheel alignment, suspension, transmission, and engine of motorized wheeled road vehicles. Means for calibrating the apparatus is included, and will be described with reference to FIGS. 3 & 11.

The figure shows a stationary light vehicle 12 partially resting on a platform 14. The platform is made strong and large enough to allow a heavy vehicle to be placed thereon.

Two pairs of short, but high-inertia rollers 16 (seen to better effect in FIG. 3) are revolvably supported in a fixed relationship to the platform 14. Each pair of rollers 16 is interconnected by a chain drive 18, seen in FIG. 3, which is suitable as all rollers rotate in the same direction.

Advantageously, the high-inertia rollers 16 are grooved and are at least 400 mm diameter, larger than prior art rollers. The rollers are positioned to support either the front wheels 20, as seen in the figure, or the back wheels 22 of the vehicle 12. For most tests the drive wheels (20 or 22) are placed on the rollers 16.

The rollers 16 can be driven by the stationary vehicle 12 resting thereon. Each pair of short high-inertia rollers 16 supports one wheel 20 of the vehicle 12.

Preferably the testing apparatus 10 is further provided with a floating roller 24 positioned between the high-inertia rollers 16 and above the centers thereof. The flexible arms 26 supporting the floating roller 24 are connected to spring means 28, preferably pneumatic, urging the floating roller 24 upwards into contact with a vehicle wheel 20 thereabove. As will be seen in FIG. 3, axial deflection of the roller 24 is measured and fed to a computer 30.

With regard to testing the engine and automatic transmission of a vehicle, a speed sensor 32 is provided which is connected to the vehicle engine and reports engine speed to the computer 30. The vehicle transmission is shifted to DRIVE and the accelerator is pressed down to its maximum. The relationship vehicle speed against time is presented as a graph on the monitor screen 34. From the data collected it is a simple matter to calculate wheel thrust, road HP, gear change time and gear change thrust peak Any required data shown on the screen 34 may be printed out by the printer 36.

With reference to the rest of the figures, similar reference numerals have been used to identify similar parts.

Figure 2:
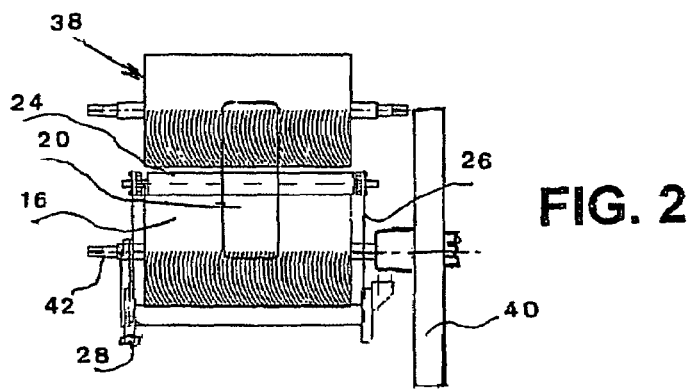
FIG. 2 is a plan view of a pair of high-inertia rollers fitted with an additional flywheel.

Referring now to FIG. 2, there is seen a detail of a testing apparatus 38 further provided with a flywheel 40, about 1 meter diameter, connected to a shaft 42 of a high-inertia roller 16. According to the power of the vehicle to be tested, one or several flywheels may be added. The flywheel 40 is used to simulate the high inertia of a heavy vehicle. A testing apparatus (not shown) to be used alternately for light and heavy vehicles has the flywheel(s) connected to the inertia rollers by a clutch. If the apparatus is dedicated only for testing heavy vehicles the clutch is replaced by a permanent mounting (as seen in the figure) or coupling for the flywheel 40.

Figure 3:
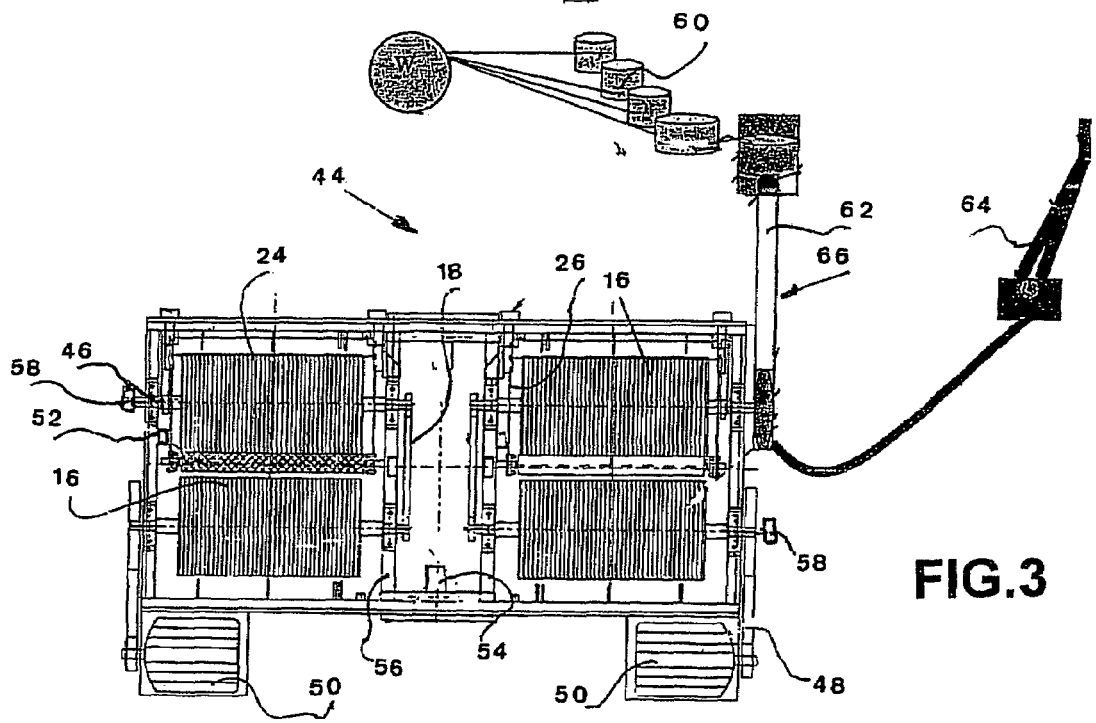
FIG. 3 is a schematic view of an apparatus including two electric motors and calibration means.

FIG. 3 illustrates a testing apparatus 44 wherein two pairs of interconnected high-inertia rollers 16 are each connected by a belt drive 48 to electric motors 50. The motors 50 are used optionally to drive the rollers 16, which in turn 10 drive the vehicle wheels 20 resting thereon to carry out various vehicle tests. A further use of the motors 50 is for self-calibration of the test apparatus 44. The hydraulically-operated dynamometer weights 60, lever 62 and hydraulic operating device 64 are shown. The dynamometer 66 will be seen to better effect in FIG. 11. As should be understood by one of ordinary skill in the electromechanical arts, each motor 50 and roller combination may be connected to either to a single or a separate electrical circuit branch. According to those embodiments of the present invention where each motor 50 is connected to a separate electrical circuit branch, each motor 50 may be driven by a soparate electrical signal, and thus each roller may be individually drivable.

Sensor means 52, such as a transducer of the differential transformer type, is connected to contact each pair of arms 26. The result is passed through signal processing means, then to the computer for data processing, display and print out as required. The sensor 52 records the axial deflection, from which the force causing said deflection is calculated by the computer 30 using the known stiffness of the arms 26.

Thrust is measured by a load cell sensor 54 making contact with the sub-frame 56 supporting the roller bearings 46.

One of each pair of the high-inertia rollers 16 is connected to a wheel speed sensor 58, suitably an optical encoder producing 1000-1200 pulses per revolution. The sensor 58 output is used by the computer 30 for calculating acceleration, deceleration, and speed.

The information gathered by the wheel speed sensor 58, together with further data, is used when carrying out braking tests. The following parameters can be tested, after the vehicle weight is recorded in the computer memory:

a) Braking force, total and per wheel b) Brake gain. This entails the addition of a force sensor to the brake pedal of the vehicle.

c) Braking time, and distance traveled before stopping d) Brake balance (ratio between right and left wheel brakes).
e) Brake fading.

The brake fading test compares the reduction of the braking force at a specified wheel or wheels. This is best illustrated by the following example:

The vehicle engine is started to drive the rollers 16 at, for example, 80 Km/h peripheral speed. The vehicle brakes are then applied to zero speed, and a 2000 N thrust force per wheel is recorded. A second test, carried out immediately after the first test, results in a thrust force of 1700 N per wheel. The third test results is 1000 N force and the fourth test gives 500 N per wheel. In the present example vehicle brake fading due to heating is found to be excessive.

f) Retarder testing:

The test is similar to the brake test. The vehicle, usually a truck or bus, is placed with its drive wheels 22 on the high-inertia rollers 16. After the rollers 16 reach top speed, the vehicle gear is put into neutral and the retarder is engaged. The braking effect of the retarder is calculated by the computer 30 on the basis of calculated deceleration and vehicle weight. The result appears on the computer monitor 34.

g) The detection of gear slip is best illustrated by the following example:—

Engine speed is monitored by the sensor 32, and the speed of the driven high-inertia rollers 16, converted to km/h, is calculated by the computer 30 from signals produced by the wheel speed sensor 58.

In top gear at simulated 137 km/h the computer records a value of engine speed 6525 rpm, the ratio being calculated as 0.020996. In second gear at a speed of 92 km/h engine speed has dropped to 4610, giving a ratio of 0.0199566. The 5.2% discrepancy between the two ratios indicates excessive gear slip. The computer monitor 34 is arranged to present the data in table form, as follows.

Shift number, speed at which gear shifted, peak engine speed before shift, engine speed after shift, vehicle speed loss during shift, thrust when gear change started, peak thrust, shift duration and gear slip in each gear. Gear slip exceeding a given percentage is highlighted on the monitor.

Seen in FIGS. 4, 5, 6, 7, 8, 9 and 10 is part of the testing apparatus 44 already seen in FIG. 3. As will be recalled, sensor means 52, such as a transducer of the differential transformer type, is connected to contact each pair of arms 26. The sensor 52 responds to axial deflection, its direction and frequency, and the computer calculates the force causing said deflection. The following tests may be conducted by the apparatus.

Figure 4:
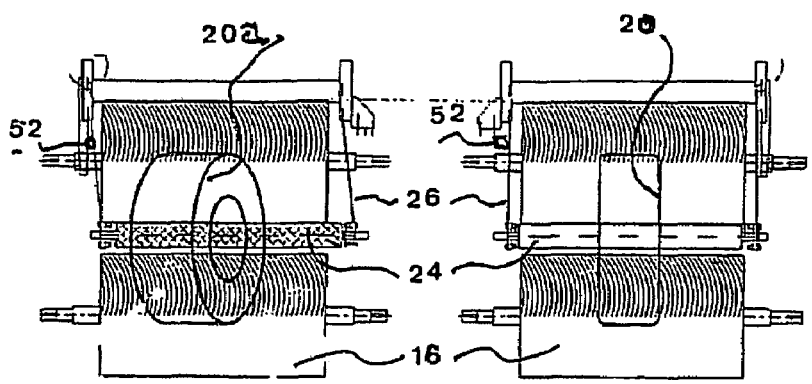
FIGS. 4 and 5 are plan views of the apparatus being used to check wheel camber.
Figure 5:
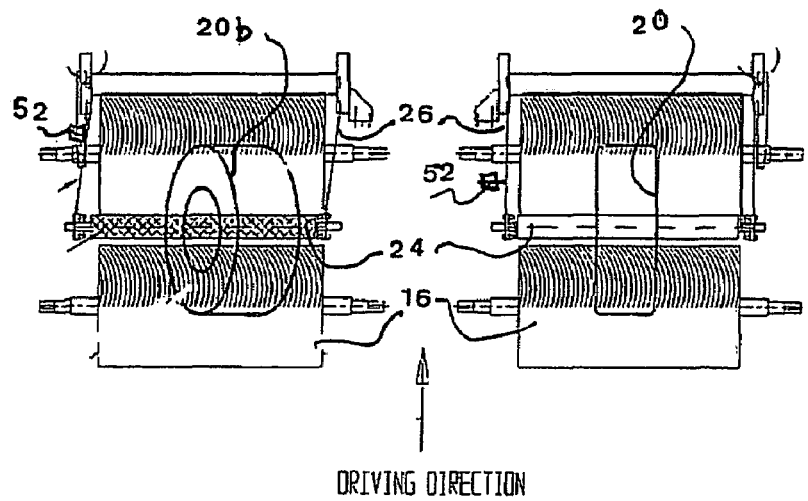

FIGS. 4-5 show testing of wheel camber. The vehicle wheel 20a shown on the left of the figures shows excessive positive camber in FIG. 4 and the wheel 20b excessive negative camber in FIG. 5. In both cases the floating roller 24 has been axially displaced, and a linear displacement sensor 52 passes an appropriate signal to a computer 30 seen in FIG. 1.

Figure 6:
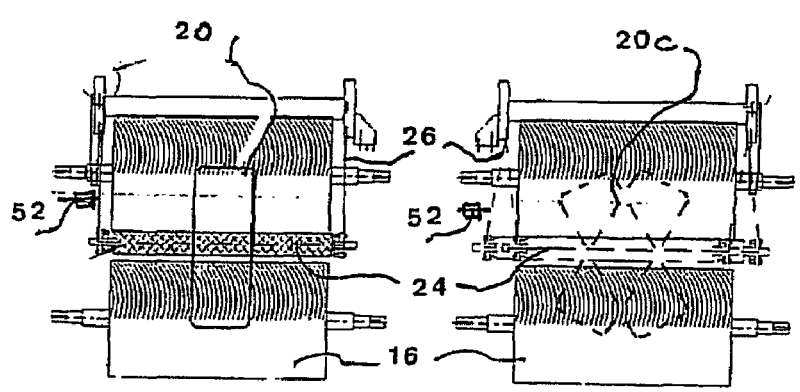
FIG. 6 is a plan view of the apparatus finding excessive suspension play in the right side wheel.
Figure 7:
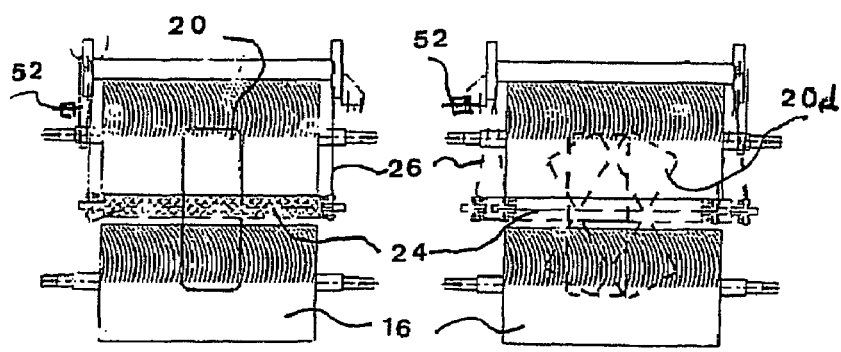
FIG. 7 is a plan view of the apparatus finding excessive vibration in the right side wheel.

In FIGS. 6-7 the vehicle 12 seen in FIG. 1 is being tested for suspension wear.

Excessive play is seen in FIG. 6 on the right hand vehicle wheel 20c. Excessive vibration of a wheel 20d is seen in FIG. 7

Again, the floating roller 24 has been axially displaced, and the linear displacement sensor 52 generates an appropriate signal. The computer processes the generated data and records the extent, the direction and the frequency of the displacement.

Figure 8:
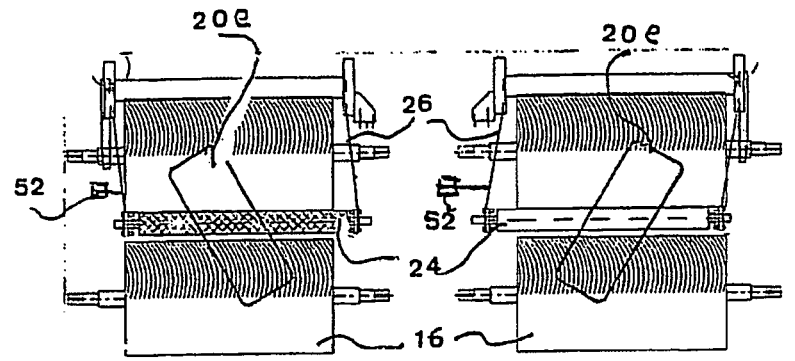
FIGS. 8 and 9 are plan views of the apparatus detecting wheel misalignment
Figure 9:
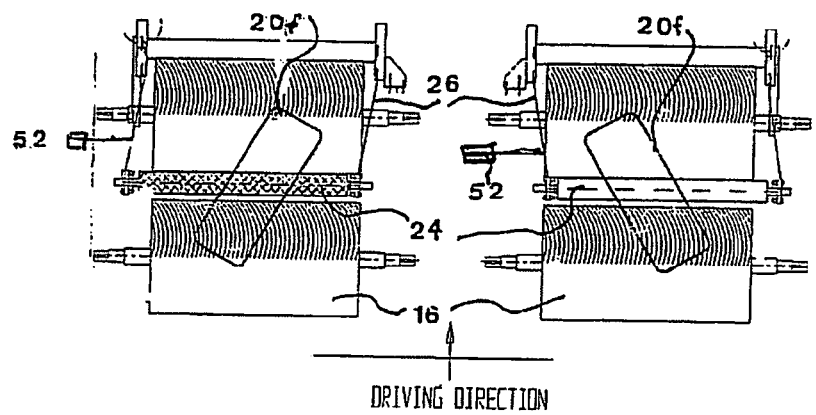

Alignment of wheels 20e is shown being tested in FIG. 8 and wheels 20f in FIG. 9. FIG. 8 illustrates excessive tow out of wheels 20e, while wheels 20f in FIG. 9 show excessive tow in.

Figure 10:
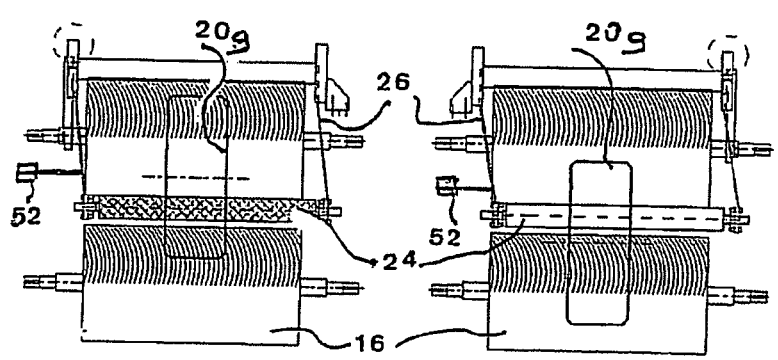
FIG. 10 is a plan view of the apparatus revealing chassis or suspension distortion.

FIG. 10 refers to a test of vehicle suspension and chassis geometry. The distortion of wheel 20g position seen in the figure, exaggerated for illustrative purposes, was probably caused by a collision. During test, both floating rollers 24 are seen deflected to the right.

Figure 11:
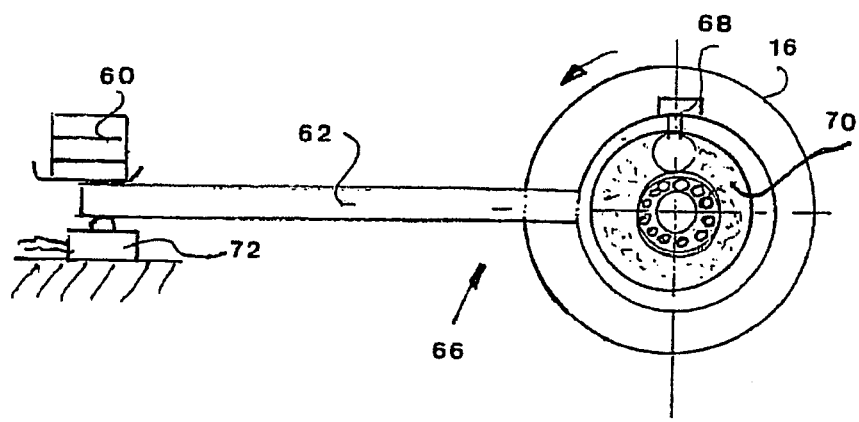
FIG. 11 is a diagrammatic view of a test apparatus fitted with a dynamometer.

FIG. 11, in conjunction with FIG. 3, shows details of the testing apparatus 44 used for self-calibration.

A hydraulically-operated absorption dynamometer 66 is connected to one of the inertia rollers 16. A torque arm 62 is connected to a braking mechanism 68 comprising a large disk brake 70. At its right extremity, the arm 62 supports the disk brake mechanism 68. The arm 62 holds an adjustable combination of weights 60 at its left extremity.

An electronic load cell 72 measures the force on the arm 62 and passes the reading to the computer 30.

To start calibration the system is stationary. A weight 60 is placed on the torque arm 62, and the computer 30 calculates the thrust or braking force on the basis of the length of the arm 62, the weight 60, and the brake drum 70 radius. The calculated value appears on the computer monitor 34.

The electric motors 50 are started, and the high-inertia rollers 16 reach maximum speed.

The electric motors 50 are disconnected, and the rollers 16 are braked hydraulically by use of the device 64 acting on the brake 70.

The computer monitor 34 will display a graph relating the load cell 72 reading to the speed and calculated inertia energy stored in the rollers 16.

Where electric motors are not installed a similar calibration test is effected by a vehicle resting on the rollers 16 and driving the rollers 16 up to a peripheral speed of 100 km/h. The vehicle gear is shifted to zero, and the hydraulic brake is applied. The remainder of the procedure, as before, is then carried out.

ABS braking systems can be tested on a similar device (not shown) wherein all four vehicle wheels rest on individual high-inertia rollers. Four independent speed sensors are used. The vehicle is brought to a simulated speed of about 80 km/h and the vehicle brakes are applied using 300-400 N force. The four output graphs showing vehicle simulated speed should have a saw-tooth shape. A flat curve indicates wheel locking caused by a faulty ABS system.

A further option (not seen) which can usefully be added to the test apparatus is a power absorption unit (electrical or hydraulic) which is preferable to the disk brake 70 for the purpose of carrying out steady state testing.

The scope of the described invention is intended to include all embodiments coming within the meaning of the following claims. The foregoing examples illustrate useful forms of the invention, but are not to be considered as limiting its scope, as those skilled in the art will readily be aware that additional variants and modifications of the invention can be formulated without departing from the meaning of the following claims.

The invention claimed is:

1. A vehicle testing apparatus, said apparatus comprising: a platform arranged to allow a vehicle to be placed thereon; at least two pairs of high-inertia rollers supported by said platform, each pair of said high-inertia rollers supporting one wheel of said vehicle and being drivable individually in the same direction; a flywheel connectable to said high-inertia rollers; sensor means connected separately to said each pair of said rollers and data processing means connected to said sensor means, said sensor means and said data processing means enabling testing of performance of said vehicle associated with each said one wheel of said vehicle; and a self calibration system adapted to facilitate calibration of said testing apparatus based on one or more signals received from said sensor means.

2. The testing apparatus as claimed in claim 1, wherein said at least two pairs of high-inertia rollers are at least 400 mm diameter.

3. The testing apparatus as claimed in claim 1, wherein said sensor means includes a load cell sensor.

4. The testing apparatus as claimed in claim 1, wherein said sensor means includes a wheel speed sensor.

5. The testing apparatus as claimed in claim 1, wherein said sensor means includes a force sensor associated with a brake pedal of said vehicle.

6. The testing apparatus as claimed in claim 1, comprising an engine speed sensor connectable to a vehicle engine to report engine speed.

7. The testing apparatus as claimed in claim 1, comprising an hydraulically-operated dynamometer, a plurality of weights, and a lever, and an hydraulic operating device, to enable calibration of said testing apparatus.

8. The testing apparatus as claimed in claim 1, comprising: a hydraulically-operated absorption dynamometer, said dynamometer connected to a high-inertia roller; a torque arm being connected to a braking mechanism at one end and an adjustable combination of weights at a second end; and an electronic load cell associated with said torque arm, to measure the force on said arm.

9. The testing apparatus as claimed in claim 1, wherein said flywheel is to measure inertia.

10. The testing apparatus as claimed in claim 1, wherein said flywheel is connected to said pair of high-inertia rollers using a clutch.

11. The testing apparatus as claimed in claim 1, wherein said high-inertia rollers are connectable to at least one electric motor allowing said rollers to drive the vehicle wheels resting thereon.

12. The testing apparatus as claimed in claim 11, wherein said electric motor is to enable self-calibration of said testing apparatus.

13. The testing apparatus as claimed in claim 11, further comprising a belt drive to connect said pair of high-inertia rollers to said electric motor.

14. The testing apparatus as claimed in claim 1 further provided with a floating roller positioned between said inertia rollers and above the center thereof and being connected to means urging said floating roller upwards into contact with a vehicle wheel thereabove.

15. The testing apparatus as claimed in claim 14, wherein said floating roller is suspended to allow limited axial movement in response to side forces acting thereon when in contact with a revolving wheel of a vehicle, said floating roller further comprising a positioning sensor to measure said axial movement.

16. The testing apparatus as claimed in claim 14, wherein said sensor means includes an axial deflection sensor respondable to axial deflection of said floating roller.

17. A vehicle testing method, comprising: providing a vehicle testing apparatus, said apparatus including a self calibration system adapted to facilitate calibration of said testing apparatus based on one or more signals received from sensors, wherein the sensors are associated separately with each pair of high inertia rollers, each said pair of high-inertia rollers being drivable individually in the same direction and supporting one wheel of a vehicle; positioning said vehicle on a platform, at least two wheels of said vehicle resting on at least two pairs of high-inertia rollers respectively, each pair of said high-inertia rollers supporting one wheel of said vehicle; accelerating said vehicle; measuring performance of said vehicle associated with each said one wheel of said vehicle; and wherein said calibrating comprises: placing a weight on a torque arm associated with an hydraulically-operated absorption dynamometer; and calculating the thrust of a wheel, based on the length of a torque arm associated with said wheel, the weight of a torque arm associated with said wheel, and the brake drum radius of said wheel, running an electric motor to operate an high inertia roller at a selected speed; discontinuing said electric motor, and breaking said rollers; and calculating inertia enemy stored in the rollers.

18. The method of claim 17, wherein said calibrating comprises:

placing a weight on a torque arm associated with an hydraulically-operated absorption dynamometer; and calculating the thrust of a wheel, based on the length of a torque arm associated with said wheel, the weight of a torque arm associated with said wheel, and the brake drum radius of said wheel, running a vehicle engine to operate an high inertia roller at a selected speed; shifting the gear of said vehicle to zero; apply the breaks of said vehicle; and calculating inertia energy stored in the rollers.

19. The method of claim 17, comprising positioning a sensor means associated with said one wheel of said vehicle, said sensor means to enable the measuring of said one wheel of said vehicle.

20. The method of claim 19, comprising providing a data processing means associated with said sensor means, said data processing means to enable testing of said one wheel of said vehicle.

* * * * *